United States Patent [19]
Dicke

[11] Patent Number: 5,827,030
[45] Date of Patent: Oct. 27, 1998

[54] THREAD FORMING JOINING ELEMENTS

[75] Inventor: Robert Dicke, Ennepetal, Germany

[73] Assignee: A-Z Ausrustung und Zubehor GmbH & Co., KG, Germany

[21] Appl. No.: 707,641

[22] Filed: Sep. 5, 1996

[30] Foreign Application Priority Data

Sep. 6, 1995 [DE] Germany .................. 195 32 874.4

[51] Int. Cl.⁶ .................................................. F16B 25/00
[52] U.S. Cl. ........................ 411/387; 411/386; 411/411
[58] Field of Search .................................. 411/386, 387, 411/411, 417, 418, 412; 408/224, 225, 227

[56] References Cited

U.S. PATENT DOCUMENTS

| | | | |
|---|---|---|---|
| 1,088,892 | 3/1914 | Foreman | 411/418 |
| 2,263,137 | 11/1941 | Oestereicher | 411/413 |
| 2,278,411 | 4/1942 | Braendel | 411/418 |
| 3,937,119 | 2/1976 | Ernst | 411/418 |
| 4,655,661 | 4/1987 | Brandt | 411/418 |
| 4,834,602 | 5/1989 | Takasaki | 411/386 |
| 4,874,278 | 10/1989 | Kawashita | 411/386 |
| 5,015,134 | 5/1991 | Gotoh | 411/413 |
| 5,044,853 | 9/1991 | Dicke | 411/417 |
| 5,273,383 | 12/1993 | Hughes | 411/413 |
| 5,294,227 | 3/1994 | Forster et al. | 411/412 |
| 5,374,146 | 12/1994 | Allen | 411/418 |

FOREIGN PATENT DOCUMENTS 9099  6/1887  Greece .................................. 411/387

Primary Examiner—Steven N. Meyers
Assistant Examiner—Tuyet-Phuong Pham
Attorney, Agent, or Firm—Jones & Askew

[57] ABSTRACT

The present invention pertains to a thread-forming joining element, in particular, a screw, which comprises a single or multiple thread that extends over at least part of the screw shaft (1), a screw tip (3) and a screw head (2). The thread extends to the point of the screw tip (3), with at least one friction edge region (11) extending over at least part of the length of the screw tip (3) in the longitudinal direction of the screw, namely on the circumferential surface in the region of the screw head (3).

9 Claims, 3 Drawing Sheets

THREAD FORMING JOINING ELEMENTS

The present invention pertains to a thread-forming joining element, in particular, a screw, which comprises a single or multiple thread that extends over at least part of the screw shaft, a screw tip and a screw head, with the thread extending to the point of the screw tip.

One screw of this type is, for example, known from German Patent Application No. 3,335,092.2. In this known screw, the flank surface of the thread is provided with indentations in the section with troughs of the undulating running edge of the thread which reduces the turning-in torque is reduced. This particular screw has proven itself very well in practical applications.

The present invention is based on the objective of disclosing a thread-forming joining element, in particular, a self-drilling screw, in which the starting torque at the beginning of the screwing-in process has a flat (slight) increase and the holding forces are not reduced in comparison to known fasteners, e.g., screws.

In accordance with the invention, this objective is attained due to the fact that at least one friction edge region extends over at least part of the joining element tip or screw tip in the longitudinal direction of the joining element or screw, namely on the circumferential surface of the region of the joining element tip or screw tip. Consequently, the screw in accordance with the invention comprises a thread that extends continuously to the point of the screw tip and forms a gripping point as well as a friction region. This friction region cuts up the material fibers, and the gripping point immediately catches during screwing-in so that an axial force is instantly generated. The screw in accordance with the invention is particularly suitable for soft wood. The friction region has such a low cutting effect that the holding forces are not influenced. Due to the special design in accordance with the invention, the core diameter is not altered, i.e., it is ensured that the holding forces are not reduced.

BRIEF DESCRIPTION OF DRAWING

FIG. 1 shows that the screw in accordance with the invention consists of a screw shaft 1, a single slot or Phillips screw head 2 and a screw tip 3. The screw shaft 1 has the same diameter over its entire length. The screw tip 3 is continuously tapered from the screw shaft 1 to the point 5. A thread 4 that extends to the point 5 of the screw tip 3 is arranged on the screw shaft 1 and the screw tip 3. In the embodiment shown, the edge 8 of the threads that form the thread 4 runs in undulations, i.e., a sequence of elevations (crests 6) and indentations (troughs 7) is provided. In this case, the outer diameter of the thread is defined by the distance between the thread edge 8 and the center axis of the screw within the region of the crests 6. In the advantageous embodiment shown, indentations 9 are formed on the flanks of the thread within the region of the troughs 7. The thread edge 8 forms the upper limitation of the indentations 9 within the region of the respective troughs 7. The indentations 9 are arranged within the region of the screw tip 3 as well as in the adjacent region of the screw shaft 1, namely over the leads of two turns. Additionally in accordance with the invention at least one friction edge region 11 (see FIG. 2) is provided which essentially extends axially over part of the length of the screw tip 3 on the circumferential surface in the region of the screw tip. FIG. 1 shows that it may be practical if a number of friction edge regions 11 are arranged on the circumference of the screw tip 3 within uniform distances such that they extend adjacent to one another. In FIG. 1, the friction edge regions 11 are arranged directly adjacent to one another on the circumference of the screw tip. The scope of the invention also includes embodiments in which the friction edge region(s) 11 extend(s) at least partially in the circumferential direction. The friction edge region 11 or the friction edge regions 11 are advantageously realized in such a way that the largest diameter of the screw tip 3 within the section that comprises the friction edge regions 11 is smaller than or equal to the core diameter of the screw shaft 1. The axial extent of the friction edge regions 11 or the friction edge region 11 is, originating at the point 5, no smaller than one lead of the screw thread and no larger than the length of the screw tip 3. In the embodiment shown, the axial extent of the friction edge region 11 or the friction edge regions 11 approximately corresponds to two leads.

Figure 1:
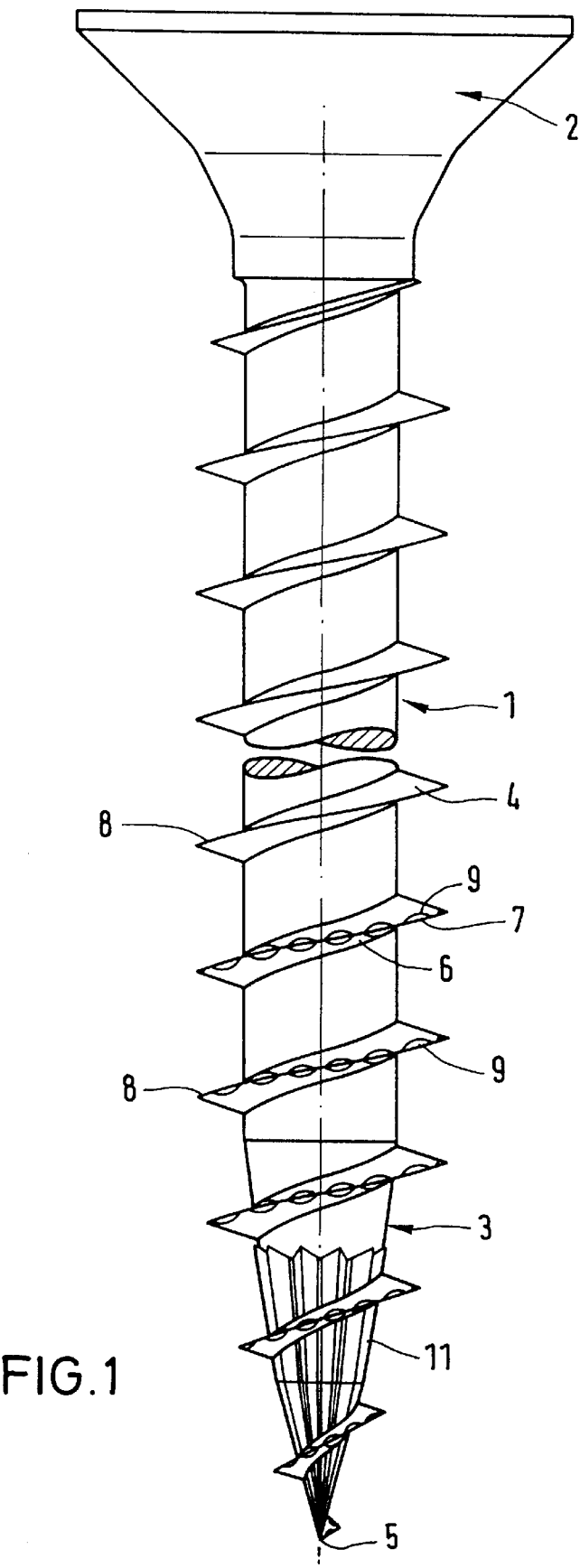
FIG. 1, a side view of a first embodiment of the screw in accordance with the invention.
Figure 2:
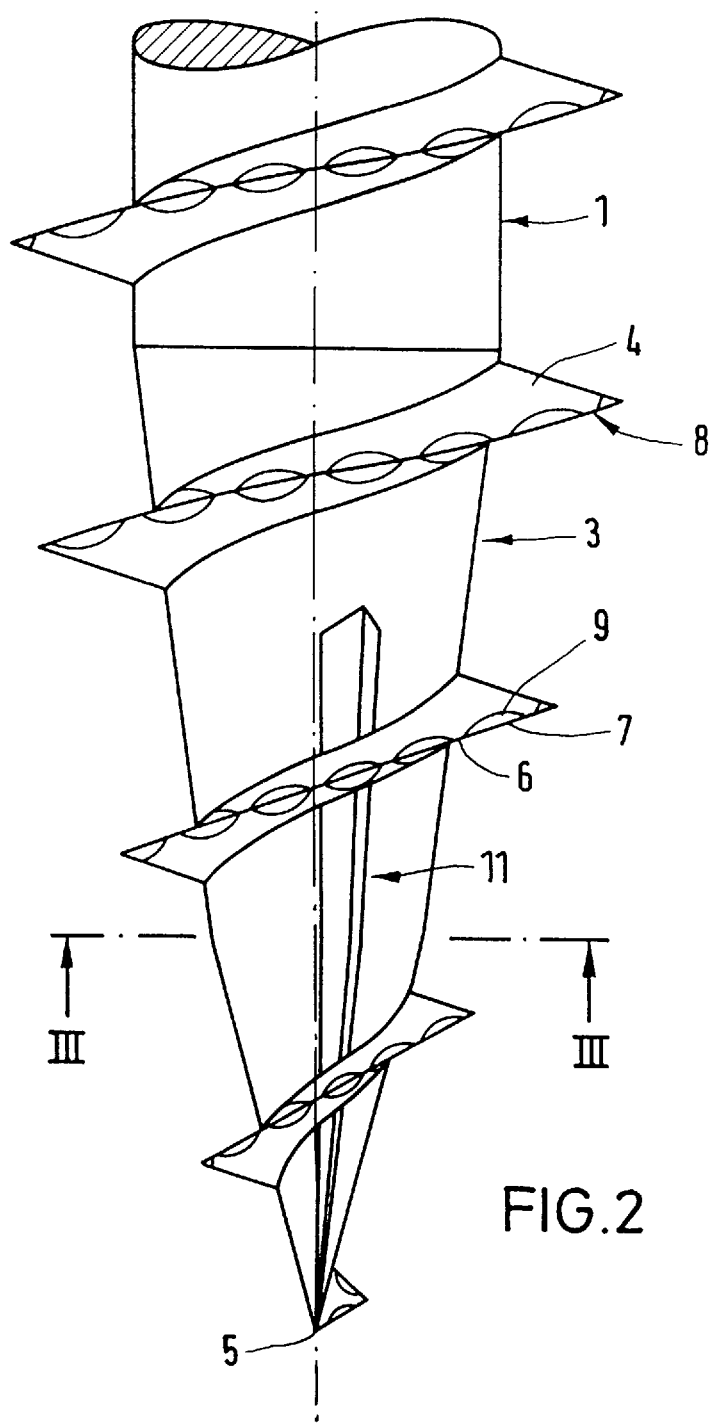
FIG. 2, a partial side view of a second embodiment of the screw in accordance with the invention, and FIG. 3, a section along the line III—III in FIG. 2.
Figure 3:
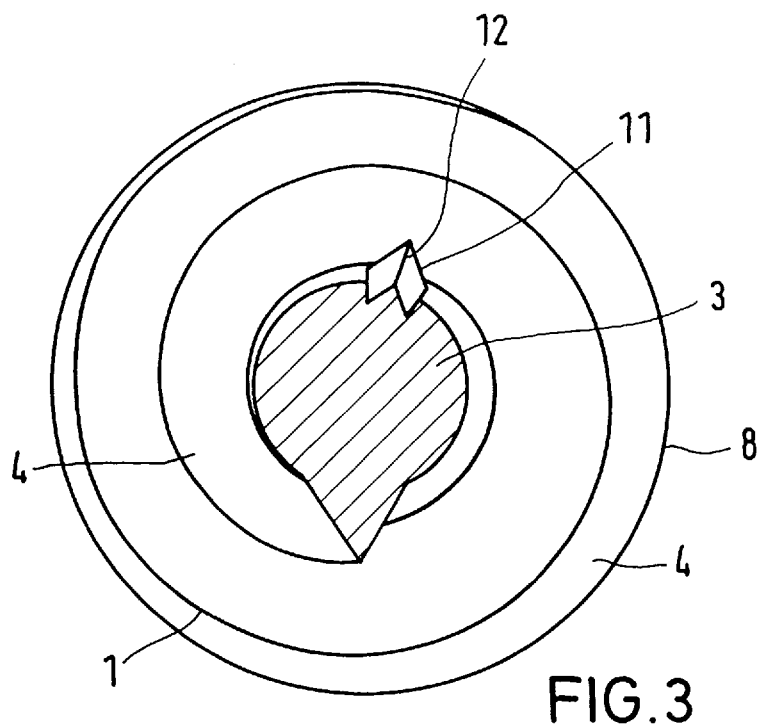
FIG. 3 shows that the friction edge region 11 has the cross-sectional shape of a triangle. In this case, symmetric or asymmetric cross-sectional shapes can be considered. In addition, this figure shows that the friction edge region 11 is realized in the form of a rib, with the tip 12 of the rib forming the friction edge. In addition, it is advantageous if the rib height continuously increases from the point 5 in the direction toward the screw head 2. In this case, the rib height within the region of the point 5 is equal to zero and increases to such a height that the largest diameter of the screw tip 3 within the friction edge region 11 is smaller than or identical to the core diameter of the screw shaft 1 at the end of the rib that forms the friction edge region 11.

Furthermore, it is known that, the advantageous embodiment shown, the screw tip 3 is realized in the form of a tip with a stepped angle, namely such that it has a larger inclination angle within its region that begins at the point 5 and has a axial extent of approximately one lead than in the adjacent region that extends to the end of the screw tip 3.

Due to the form of the self-drilling and thread-forming screw in accordance with the invention which comprises a thread that continuously extends to the point 5 and a friction edge region 11 within the region of the screw tip 3, a flatter (lower) starting tongue is attained without having to increase the core diameter. Consequently, the material is not split apart when the screw is screwed in because the friction cones cut up the material fibers.

The scope of the invention also includes embodiments in which the thread edge 8 is smooth, i.e., the thread edge does not comprise a sequence of crests 6 and troughs 7. In addition, it is possible to realize an embodiment in which only a sequence of crests 6 and troughs 7 is provided and no indentations 9 are arranged within the flank region of the thread. The screw thread may also be formed as multiple threads.

I claim:

1. A self-drilling screw intended for use in soft fibrous material and comprising:
   a screw head (2);
   the screw head connected to a screw shaft (1) with a core diameter;
   the screw shaft having a screw tip (3) with a circumferential surface which is tapered from the screw shaft (1) to a point (5);
   at least one thread (4) that extends over at least part of the screw shaft (1) to the point (5) of the screw tip (3);

at least one friction edge region (11) the whole of which is located within the region of the screw tip (3), the friction edge region being oriented in the axial direction of the screw; and the friction edge region being formed by a rib that begins at the point (5) of the screw tip (3) and that extends at least over a height of one lead of the thread (4) on the circumferential surface of the screw tip (3);

whereby the friction edge region cuts said material so that the point (5) can immediately catch to generate axial force during screwing-in of the screw.

2. A screw according to claim 1, characterized in that a largest diameter in the region of the screw tip (3) including a height of the rib that forms the friction edge region (11) is not larger than the core diameter of the screw shaft (1).

3. A screw according to claim 1, characterized in that the height of the rib that forms the friction edge region (11) increases in the direction toward the screw head (2).

4. A screw according to claim 1, characterized in that a plurality of ribs that extend in the same axial direction and form said friction edge region (11) are uniformly distributed over the circumference of the screw tip (3).

5. A screw according to claim 1, characterized in that the rib begins with a height of zero at the point (5) of the screw tip (3), and that the height of the rib increases substantially continuously along the extent of the rib.

6. A screw according to claim 1, characterized in that the screw tip (3) is realized in the form of a tip that has two different regions with different inclination angles of its circumferential surface.

7. A screw according to claim 1, characterized in that the thread (4) has an edge (8) that at least within the region of the screw tip (3) and within a region of the thread (4) that is situated adjacent the screw tip (3), forms undulations over a height of one to two leads of the thread (4) such that a sequence of crests (6) and troughs (7) is formed, with indentations (9) being formed in the flanks within the region of the troughs (7).

8. A screw according to claim 1, characterized in that the thread (4) is a multiple thread.

9. A screw according to claim 1, characterized in that the rib has a triangular cross section with a tip (12) of the rib forming the friction edge.

* * * * *